July 18, 1933.  S. M. TEMPLETON  1,918,877
SCALE
Filed Aug. 8, 1930   3 Sheets-Sheet 1

Inventor
S. M. Templeton
By his Attorney
W. M. Wilson

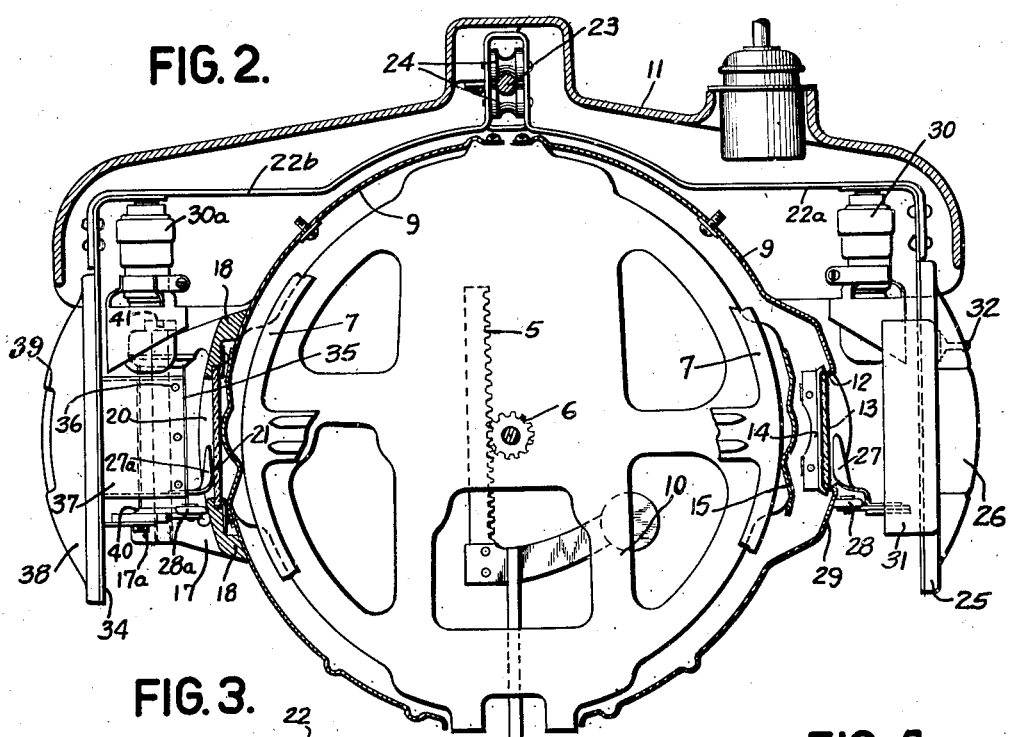
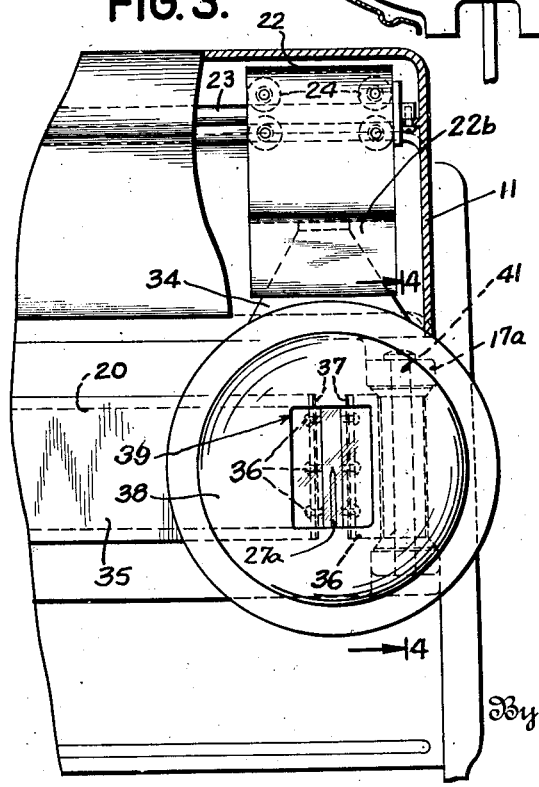
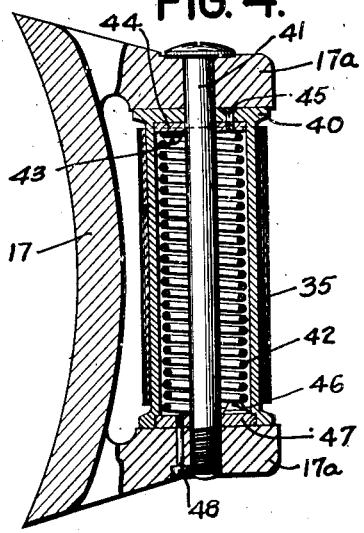

July 18, 1933.　　　S. M. TEMPLETON　　　1,918,877
SCALE
Filed Aug. 8, 1930　　　3 Sheets-Sheet 3

Patented July 18, 1933

1,918,877

UNITED STATES PATENT OFFICE

SAMUEL MELBOURNE TEMPLETON, OF DAYTON, OHIO, ASSIGNOR TO DAYTON SCALE COMPANY, OF DAYTON, OHIO, A CORPORATION OF NEW JERSEY

SCALE

Application filed August 8, 1930. Serial No. 473,938.

This invention relates to computing and weighing scales such as are commonly used by retail merchants.

The general object of the present invention is to provide an improved scale in which it is possible to read an indication of the computed cost of the goods on both the merchant's and customer's sides of the scale.

It has been the practice in the scale art to provide computing scales with a weighing mechanism including a graduated chart arranged to indicate the total cost of the goods for any specific weight and price per pound within the weighing capacity of the scale. It has frequently been the practice to construct computing scales with a double reading chart permitting both the customer and the merchant to read the cost of the goods simultaneously. Certain disadvantages are found to be the case with such scales, principal among them being the chances of error and dispute because of a customer having misread the chart indication.

The merchant, through constant use of the scale, quickly acquires skill in reading the chart and is less likely to make an unintentional error. The customers, on the other hand, only occasionally see goods weighed and the narrow strip of chart with its confusing multiplicity of price columns is often bewildering to the customers, who, for the most part, are comparatively ignorant of chart reading methods.

A feature of the present invention is the provision of means for restricting the customers' view of the chart to a single column selected by the merchant according to the price per pound of the goods, such means comprising a shutter mechanism concealing all but the desired portion of the chart.

A further object of this invention is to provide a double magnifier for the purpose of greatly enlarging the portions of the chart selected on both sides of the scale for an indication of the cost or weight of the article.

Other objects and advantages of the present invention will be pointed out in the following specification and claims or will be apparent from a study of the accompanying drawings, which show what is at present considered a preferred embodiment of the invention.

In said drawings:

Fig. 2 is a vertical section through the upper part of the scale, the section having been taken approximately on the lines 2—2 of Fig. 1 with the carriage supporting the magnifiers shifted to a position midway between the sides of the scale.

Fig. 3 is a partial vertical elevation of the upper right portion of the scale, viewed from the customer's side of the scale, illustrating the arrangement of the magnifier on that side.

Fig. 4 is an enlarged vertical section taken approximately on the lines 4—4 of Fig. 3.

Figure 1:
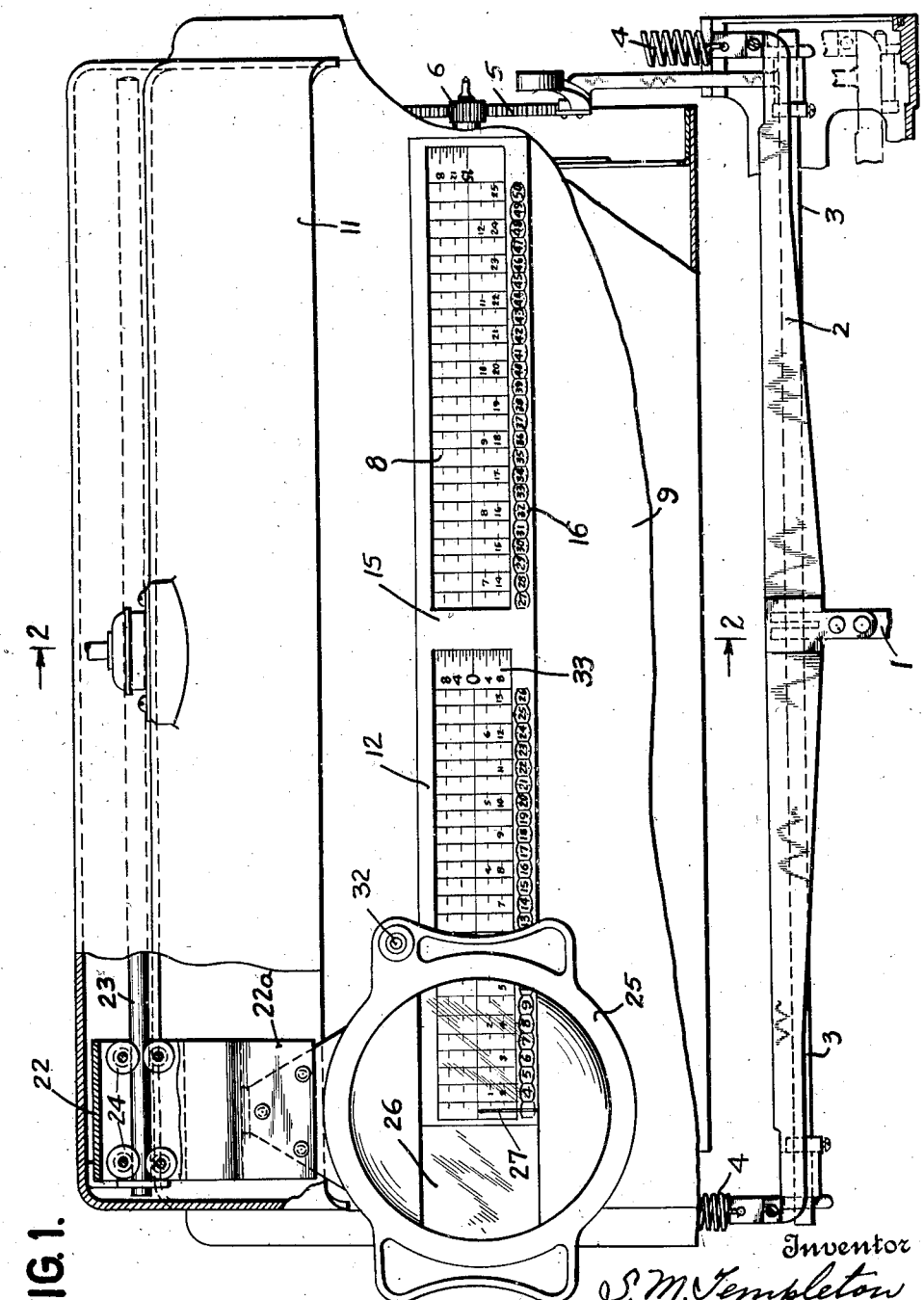
Fig. 1 is a vertical elevation of the upper portion of a scale showing the arrangement of the magnifier on the merchant's side of the scale.

This invention is shown and described as applied to a scale of the general type shown and described in Letters Patent No. 1,611,569 granted December 21, 1926, to T. H. Strachan to which reference may be had for a description of the weighing mechanism, however, it is not desired to limit the invention to the particular form of scale shown as it may be applied to others equally as well.

Briefly the weighing mechanism comprises a load support (not shown) the effect of which is transmitted as a downward pull on draft rod 1 rigid with horizontal draw bar 2 connected rigidly to the equalizer bar 3. The draw bar 2 at each end is connected to a counterbalance spring 4 while the equalizer bar is connected at each end to a rack carrying bar 5, the racks meshing with pinions 6 on the drum shaft to rotate the drum chart in accordance with the load.

The cylinder or drum 7 carrying the computing chart 8 is pivotally mounted within the casing 9 and between side plates 10. The casing 9 is provided for the purpose of protecting the drum and chart from dust or possible injury and is in turn covered by a hood or cover 11 overlying and protecting the entire top of the scale.

The casing 9 is provided with a narrow opening or slit 12 extending across the merchant's side of the scale through which a narrow strip of the chart is clearly visible at all times. The opening 12 is rendered dust tight by means of a narrow strip of glass 13 behind the opening, the glass being held securely in place by metal frames 14. Supported between the end frames 10 is a suitable plate 15 provided with slits extending lengthwise of the drum 7, the price numerals being marked on the lower edge of the slits as at 16, Fig. 1.

A frame 17 including two parallel bars 18 is mounted upon the exterior surface of the casing 9 on the customer's side of the scale (the left side, Fig. 2) and extends crosswise of the scale in front of a plate 19 similar to the plate 15. It will be understood that the construction of the frame 17 provides a narrow opening 20 on the customer's side of the scale permitting the customer to view a portion of the chart 8 corresponding to the portion visible through the opening 12. The opening 20 is rendered dust tight by a strip of glass 21.

One of the novel features of the present invention is the provision of means for permitting the customer to view the computed amount which he must pay for the goods weighed. In order to accomplish the foregoing result a device is provided which may be selectively set by the merchant when the goods have been weighed and exposes to the customer's view the portion of the scale chart corresponding to the product of the price per pound and the weight of the goods, all other portions of the chart on the customer's side being concealed from view.

A second feature comprises the provision of means for magnifying the portions of the chart being read on both sides of the scale in order to more easily read the chart indication.

A manually shiftable carriage is provided, generally indicated by the numeral 22, Figs. 1 to 3, and comprises a frame supported and guided by means of a cross rod 23, the frame being provided with anti-friction rollers 24 which serve to support and guide the frame. The rod 23 is supported within the hood 11 directly above and parallel with the drum 7 so as to permit shifting of the carriage 22 from one side of the scale to the other.

The frame 22 is provided with two portions 22a, 22b extended toward the merchant's and customer's sides, respectively, of the scale. The portion 22a is further extended vertically downward and has riveted or otherwise fastened thereto a lens holder 25 carrying a lens 26. An index or pointer 27 is fastened to the holder 25 and extends upwardly with its point on a level with a hair line or index wire extending transversely of the scale behind the opening 12 in the casing 9. An anti-friction roller 28, attached to the holder 25, bears upon the raised portion 29 of the cabinet 9 and guides the merchant's side of the carriage.

The extension 22a supports a small electric lamp 30 which is mounted above and in front of the opening 12 and is provided with a reflector which casts the light directly upon the portion of the chart behind the lens 26. The holder 25 is provided with bent-over portions 31 on each side of the lamp which further confines the illumination to a small portion of the chart. A handle 32 attached to the holder 25 is provided for convenience in shifting the carriage from side to side. The lens holder 25 is so constructed as to cover all of the exterior curved surface of the lens except a narrow band corresponding to the opening 12. It will be clear from the foregoing description that the carriage comprising frame 22 may be easily shifted to bring the pointer 27 into coincidence with any of the several price bands or columns on the chart 8 corresponding to the graduations 16 or the band 33 representing weights up to thirty pounds.

The extension 22b of frame 22 is similar in shape to the extension 22a and has fixed thereto a frame 34 carrying a lens 26a and an electric lamp 30a similar, respectively, to the lens 26 and lamp 30. An index or pointer 27a is carried by the frame 34 and is positioned to register with the same price column on the chart 8 as the pointer 27. The frame 34 also carries an anti-friction roller 28a similar to the roller 28 riding on the lower frame member 18, Fig. 2.

Figure 5:
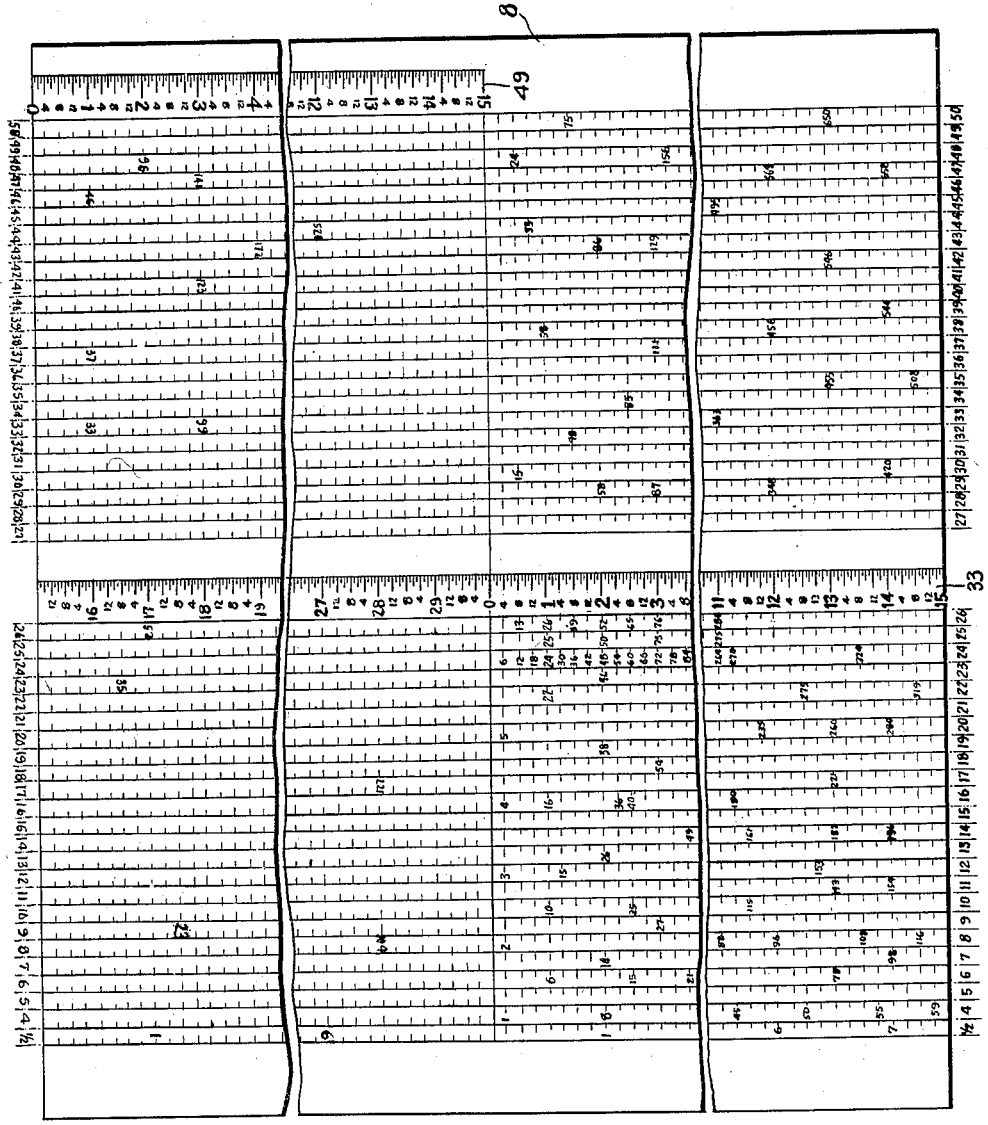
Fig. 5 is a developed view of the chart, portions having been cut away for convenience in illustration.

It will be observed by a reference to Fig. 5 that the chart is divided into two halves or computing fields, one for indicating the amount and weight to the merchant and the other to the customer, the lower half, Fig. 1, being the merchant's half while the upper half is the customer's half. It is clear, therefore, that the computed price up to fifteen pounds of weight will be rendered visible on both sides of the scale by merely bringing the pointer 27 into coincidence with the proper price column represented by a graduation 16.

One of the important features of the present invention is the provision of a shutter mechanism which prevents the customer from being confused in reading the chart indication by covering from view all parts of the chart except for the price or weight column to which the index 27a has been manually positioned by the merchant after weighing the goods. The average customer is ignorant of the correct manner in which the chart should be read so that the shutter mechanism greatly reduces the chances of misunderstanding between merchant and customer owing to the customer having erroneously read the cost indication.

The shutter mechanism comprises two flexible strips or tapes 35, preferably very thin metal such as steel tape adapted to conceal the opening 20 and attached at one end to the frame 34 by means of screws 36, the frame being provided for this purpose with two parallel wing plates 37 which are spaced apart a distance equal to the width of one price column on the chart. The plates 37 are just below the electric lamp 30a and between the lens 26a and the chart 8. It will be observed from Figs. 2 and 3 that the lens mounting includes a shield or cap 38 having a small opening 39 which permits the customer to view the enlarged image of the chart produced by the lens 26a together with the usual hair line.

The other ends of the tapes 35 are wound upon and fastened to spring drums 40 journalled upon screws 41 passing through lugs 17a formed as part of the frame 17. There is one of the drums 40 mounted in this manner on each end of the frame 17 so that it will be clear that the tapes 35 extend in front of the opening 20, Fig. 3, and effectively conceal all parts of the chart except the single column coinciding with the index 27a.

Each of the spring drums 40 is free to rotate upon the screws 41 as an axis and is provided with a coil spring 42 of the torsion type, one end of which is anchored by a screw 43 to a disk 44 attached by means of a screw 45 to the drum 40. The other end of the coil spring is anchored by screw 46 to disk 47 which in turn is fastened to the lower lug 17a by a screw 48. The construction is such that the coil springs 42 resist unwinding of the tapes 35 from the spools so that the tapes are always taut when the carriage 22 is manually shifted to a desired price column on the chart, one spool rewinding as the other is unwound.

It is believed that the operation of the mechanism just described will be readily understood from the foregoing, however, for sake of clearness and completeness, a brief description will be given of the manner in which the invention will be used in practice.

The goods are weighed in the usual manner with the index 27 set in the extreme right hand position, Fig. 1, in order to permit the customer to view the reading in the weight column 49 on the chart and verify the weight of the article. The index 27 is then set to the column on the chart representing the price per pound by bringing the index 27 into coincidence with the proper price graduation 16. The index 27a by this process will likewise be shifted from column 49 to the column corresponding to the price-per-pound column indicated by the pointer 27. The merchant and customer can now read the cost of the goods simultaneously, the customer's view of the chart being confined to the single column being read owing to the shutter tapes 35 concealing all but the desired column.

A further feature of the present invention is the provision of means for extending the weight indicating range of the scale. This result is accomplished by providing the chart with a customer's weight indicating column reading over half the perimeter of the drum and corresponding with the first half of the merchant's weight indicating column. The merchant's weight indicating column, however, extends completely around the drum.

Fig. 5 is merely an illustrative example of the form of the chart which may be used and has been arranged to compute and indicate the cost for weights of goods up to fifteen pounds over a price range from ½¢ per pound to 50¢ per pound. Column 49, for indicating the weight of the goods to the customer, is graduated up to fifteen pounds and extends over half the perimeter of the chart while column 33, the merchant's weight indicating column, extends completely around the chart and is graduated up to thirty pounds.

Two similar computing fields are provided on the chart, one for the customer and one for the merchant, each field covering substantially half of the chart. Each price column on the merchant's half of the chart is in line circumferentially with the corresponding column on the customer's half of the chart, therefore, it will be clear that a cost indication visible through the magnifier on the merchant's side will be also visible through the magnifier on the customer's side.

The present invention, for sake of convenience in description and to assist in a clear understanding of the principles involved, has been shown as applied in a specific form, however, it is not desired to limit the invention to the precise form of embodiment shown and described as it is capable of being used in various forms, all falling within the scope of the claims which follow:

1. In a weighing scale, a rotary drum chart, a hood over the chart, a track centrally provided on said hood, a carriage, and means for suspending the carriage for slidable movement on the track, the carriage having reading devices for simultaneously reading opposite sides of the chart, the hood having portions overhanging each of the reading devices and guarding and concealing the suspending means.

2. In a weighing scale, a rotary drum chart, a hood over the chart, a track centrally provided on said hood, a carriage, and means for suspending the carriage for slidable movement on the track, the carriage having reading devices for simultaneously reading opposite sides of the chart, the hood having portions overhanging each of the reading devices and guarding and concealing the suspending means, said carriage comprising a frame having oppositely disposed legs, each opposite one side of the chart and each carrying one of said reading devices, bearing elements, and an integral, hollow, folded portion between said legs for journalling in the interior opposite walls thereof the bearing elements.

3. In a scale, a rotary drum chart having duplicate sets of graduations arranged in parallel columns, a casing for the chart having sight windows, one at the merchant's side for disclosing one set of graduations to the merchant and the other at the customer's side to disclose the other set to the customer, magnifying lenses, one at each sight window and located in front of the chart to provide the observer with a magnified virtual image of the graduations, supporting and guiding means rigid with the casing for supporting and guiding the lenses for movement transversely of the columns, connections between the lenses whereby one lens may be grasped to move it to a column to be magnified and to thereby jointly move the opposite lens to magnify the corresponding column at the other side, a hood rigid with the casing and extending substantially the entire width of the casing for concealing, covering and protecting the aforesaid supporting and guiding means and said connections between the lenses, and illuminating means at opposite sides of the scale for illuminating the customer's and merchant's sides of the chart to facilitate reading of the latter by the lenses, said hood having cowls at opposite sides of the scale overhanging and protecting the illuminating means.

4. In a weighing scale, a rotary drum chart having duplicate sets of graduations arranged in parallel columns, a casing for the chart having sight windows, one at the customer's side through which one of the duplicate sets of graduations may be viewed and one at the merchant's side through which the other set may be viewed, a pair of reading devices, one at the customer's side and the other at the merchant's side, guiding and supporting means rigid with the casing for guiding and supporting the reading devices to move along the sight windows and axially of the chart to select the columns to be read on each side, and a shutter device connected to and extending from opposite sides of the customer's reading device, means provided on the customer's side of the casing and independent of the reading devices to guide and support the shutter device for movement longitudinally of the customer's sight window, said shutter being operable from the merchant's side of the scale by moving the merchant's reading device to conceal all the customer's chart columns except those selected by the merchant for the customer to read.

5. In a weighing scale wherein automatic counterbalancing means of a predetermined maximum capacity or range is provided; the combination of a casing having at opposite sides elongated sight windows, and a rotary cylindrical chart within said casing and operated by said counterbalancing means, the chart having duplicate sets of graduations disposed at opposite sides of the chart, each set extending about half-way around the chart and visible in upright position through one of said sight windows only while the counterbalancing means is moving through half its capacity or range, the chart also having a set of weight graduations extending substantially all the way around the chart to be viewed through one of said windows in upright position throughout the entire capacity movement or range of the counterbalancing means, whereby articles may be weighed beyond the range of the first-mentioned duplicate sets of graduations.

SAMUEL M. TEMPLETON.